UNITED STATES PATENT OFFICE.

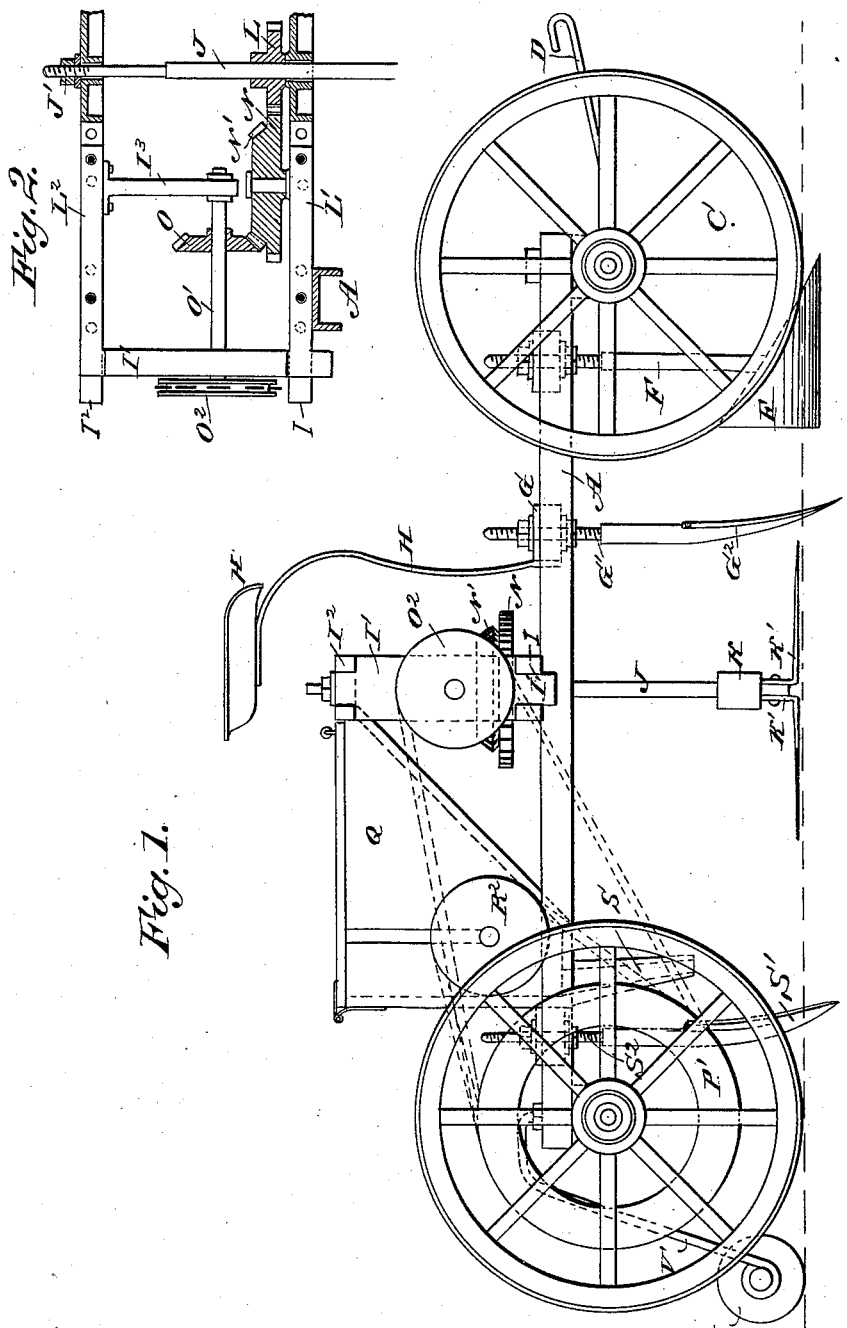

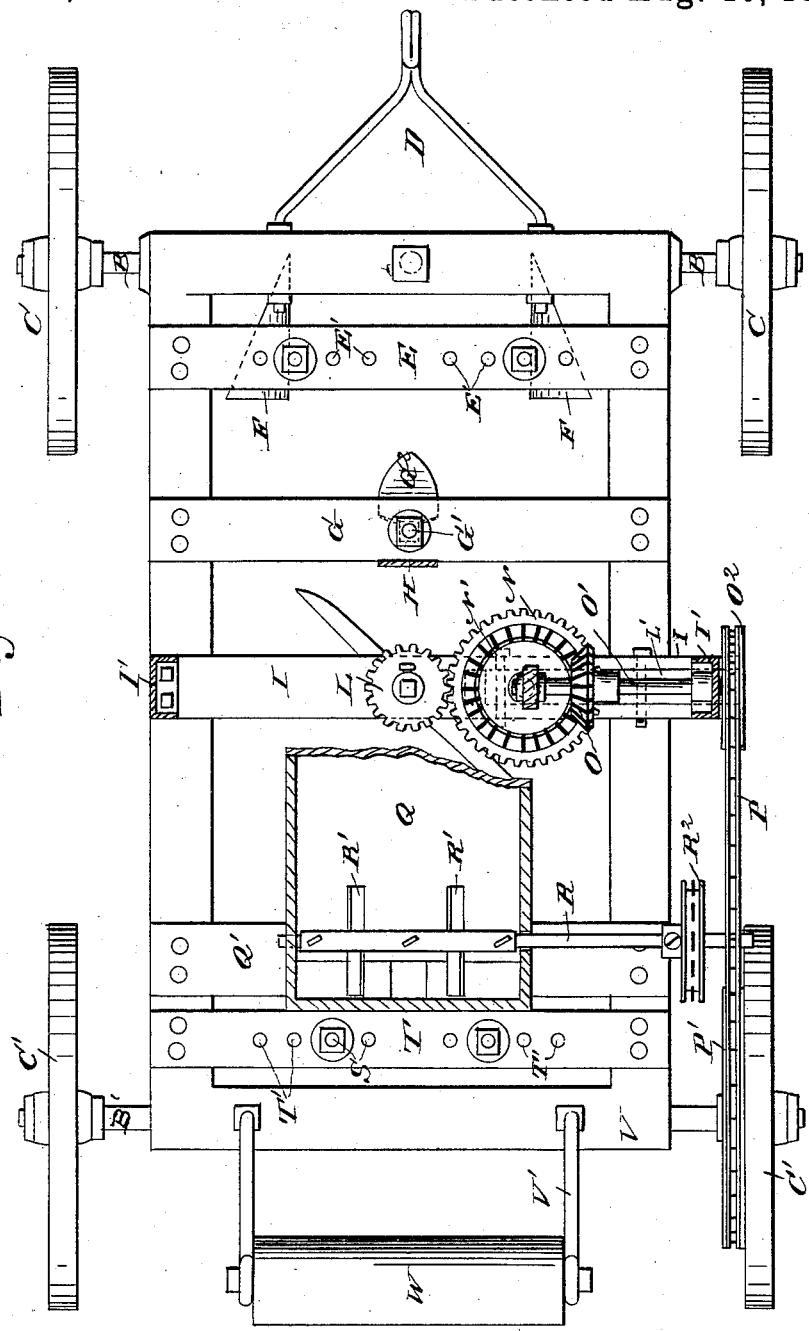

AUGUST A. WEINMANN, OF DALLAS, TEXAS.

COMBINATION-PLOW.

SPECIFICATION forming part of Letters Patent No. 347,144, dated August 10, 1886.

Application filed December 24, 1885. Serial No. 186,645. (No model.)

*To all whom it may concern:*

Be it known that I, AUGUST A. WEINMANN, of Dallas, in the county of Dallas and State of Texas, have invented a new and Improved Combination-Plow, of which the following is a full, clear, and exact description.

The object of my invention is to provide a new and improved combination-plow, which can be used as a corn, cotton, or sugar-cane planter, and also as a cleaner and chopper.

The invention consists in the combination of parts and details, as will be fully described and set forth hereinafter, and then pointed out in the claims.

Reference is to be had to the accompanying drawings, forming part of this specification, in which similar letters of reference indicate corresponding parts in all the figures.

Figure 1 is a side view of my improved combination-plow, parts being broken out and others being in section. Fig. 2 is a detail view of the same. Fig. 3 is a plan view, partly in section.

The frame A of the plow is formed of channel-irons or other suitable wrought-iron bars, and is provided with two axles, B B', on which the wheels C C' are mounted in the usual manner, and to the front axle the hook D is secured, to which the double-tree is hooked.

A short distance from the front of the frame the cross-bar E is secured on the same, and is provided with a series of apertures, E', for receiving the upper screw-threaded ends of bars F, carrying the plows F' on their lower ends, which rods can be locked in place at the desired elevation by means of nuts and lock-nuts of the usual construction, and the said bars can be adjusted to greater or less distance from each other by placing them in different apertures E' in the bar E.

Some distance behind the bar E the cross-bar G is secured on the frame, and in said bar the rod G' is held, which carries the shovel G² on its lower end, the rod G' being also provided with a nut and lock-nut for locking it at the desired elevation. The spring-bar H is secured on the cross-bar G, and carries the seat H for the driver.

Behind the cross-bar G the cross-bar I is provided, on the ends of which the two standards I' are secured, which support the cross-bar I².

In the cross-bars I I² the vertical shaft J is journaled, which can be held at the desired elevation by means of nuts J' on the upper cross-bar, I², and on the lower end of which shaft the knife or cutter K is held detachably, which is provided with two opposite blades, K'. The shaft J, which is squared, is passed through the squared central aperture of the cog-wheel L.

The cog-wheel L engages with the cog-wheel N, mounted on the sliding part L' of the bar I, and provided with the bevel-cogs N', engaging with the bevel cog-wheel O. On the horizontal shaft O', journaled in one of the standards I', and in the bar I³, projecting downward from the sliding part L² on the top cross-bar, I², and on the outer end of said shaft the sprocket-wheel O² is mounted, over which the driving-chain P can be passed, which can also be passed over the sprocket-wheel P' on one of the rear wheels, C'.

Behind the cross-bars I I', the seed-hopper Q is provided, which rests on the cross-bar Q', and in the said seed-hopper the shaft R is journaled, which has the wings R' within the hopper and the sprocket-wheel R² on its end, over which sprocket-wheel the chain P can be passed.

The spout S projects downward from the seed-hopper Q, and behind said spout S the two shovels S' are held on the rods S², passed through apertures T' in the cross-bar T, and the said rods are locked at the desired elevation by means of nuts and lock-nuts.

On the rear cross-bar, V, of the frame the U-shaped rod V' is hung, and on the cross-piece of the same the iron roller W is mounted, which runs on the ground.

When a large cutter K is used, a larger wheel L is used, and for this reason the part of the frame carrying the wheels O and N N' must be mounted to slide. For smaller cutters smaller wheels are used.

The operation is as follows: The two plows F' are adjusted as far apart as necessary. When the plow is moved in the direction of the arrow a', they form a ridge, and then the shovel G' makes a furrow, shallow or deep, as may be necessary, and the seed drops through the seed-spout S into the furrow made by the shovel G². The seed is then covered by the earth thrown up by the two shovels S', and then the earth is pressed down by the roller W. When cotton is to be planted, the shaft R is revolved from a rear wheel, to cause the wings R' to agitate the seed to prevent it from clogging in the hopper. When corn is to be planted, the shaft R and the wings R' on the same are removed, as the corn does not pack and clog in the hopper, but passes through the spout very freely.

When the machine is to be adjusted as a chopper and cleaner, the roller W and the shovel G² are removed, and the driving-chain P is adjusted to revolve the shafts O' J, which latter is removed or raised when the machine is to be used as a planter. The plows or sweeps F' are then so adjusted that there are three inches space between them. The plows or sweeps F are each about one and a half inch from the plant and clean it from grass, and then the knives K cut the plants at any distance from each other. The two shovels S' then throw dirt to the plants, and according to the height of the plant they can be adjusted deep or shallow. The knives K used are of different sizes, so as to cut the plants any desired distance from each other.

When the implement is used for plowing and the roller W is not to be used, a shovel is secured in one of the holes which receive the rods V', and a sweep secured in the other.

The seed-box may be provided with a slide for entirely or partially closing it.

Having thus described my invention, what I claim as new, and desire to secure by Letters Patent, is—

1. The combination, with a frame mounted on wheels, of the vertical shaft J, supported on said frame, and having a cutter on its lower end, and a removable gear, L, of gearing adjustable to and from the said gear L and driven from a pulley or wheel on one of the shafts, whereby the gear L may be removed and replaced by a different-sized gear, and the driving-gearing be adjusted thereto, substantially as set forth.

2. The combination, with the wheeled frame A, having cross-bars E T at its opposite ends, provided with a series of apertures, E' T', and the cross bar I², centrally apertured, of the rods F S, having plows F' S' on their lower ends screw-threaded at their upper ends, and nuts on said screw-threaded ends at opposite sides of the bars, the vertically-adjustable rotary shaft J, screw-threaded at its upper end and provided with an adjusting-nut, a cutter, K, on the lower end of the shaft, the removable gear L, loosely mounted on the shaft to slide thereon and turn therewith, and the adjustable gearing for engaging the gear-wheel on the shaft J, substantially as set forth.

3. The combination, with a frame mounted on wheels, of the cross-bars I I², the adjustable pieces L' L² on the same, the vertical shaft J, the cutter K on the lower end of said shaft, the cog-wheel L on said shaft, the cog-wheel N N', engaging with the cog-wheel L, the bevel cog-wheel O, operating the cog-wheel N N', and the sprocket-wheel O² on the end of the shaft on which the bevel cog-wheel O is mounted, substantially as herein shown and described.

AUGUST A. WEINMANN.

Witnesses:
R. E. BURKE,
GEO. FAHRAND.